(12) United States Patent
Jeong et al.

(10) Patent No.: US 10,006,982 B2
(45) Date of Patent: Jun. 26, 2018

(54) SOLAR POSITION TRACKING ACCURACY MEASUREMENT SYSTEM BASED ON OPTICAL LENS

(71) Applicant: INDUSTRY ACADEMIC COOPERATION FOUNDATION OF NAMBU UNIVERSITY, Gwangju (KR)

(72) Inventors: Byeong Ho Jeong, Gwangju (KR); Ju Hoon Park, Gwangju (KR)

(73) Assignee: Industry Academic Cooperation Foundation of Nambu University, Gwangju (KR)

( * ) Notice: Subject to any disclaimer, the term of this patent is extended or adjusted under 35 U.S.C. 154(b) by 0 days. days.

(21) Appl. No.: 14/900,756

(22) PCT Filed: Nov. 15, 2013

(86) PCT No.: PCT/KR2013/010381
§ 371 (c)(1),
(2) Date: Dec. 22, 2015

(87) PCT Pub. No.: WO2015/002351
PCT Pub. Date: Jan. 8, 2015

(65) Prior Publication Data
US 2016/0146921 A1 May 26, 2016

(30) Foreign Application Priority Data

Jul. 1, 2013 (KR) .................. 10-2013-0076502

(51) Int. Cl.
*G01S 3/786* (2006.01)
*H02S 20/32* (2014.01)
*F24J 2/38* (2014.01)

(52) U.S. Cl.
CPC .......... *G01S 3/7861* (2013.01); *H02S 20/32* (2014.12); *F24J 2002/385* (2013.01)

(58) Field of Classification Search
CPC ..... H02S 20/32; H02S 20/30; F24J 2002/385; F24J 2/38; F24J 2/40; H01L 31/042;
(Continued)

(56) References Cited

U.S. PATENT DOCUMENTS 2,159,394 A * 5/1939 Mellor .................. G02B 15/14
359/689
2,500,017 A * 3/1950 Altman .................. G02B 13/00
359/671
(Continued)

FOREIGN PATENT DOCUMENTS

KR 10-2009-0003964 A 1/2009
KR 10-2009-0023765 A 3/2009
(Continued)

*Primary Examiner* — John Lee
(74) *Attorney, Agent, or Firm* — Rabin & Berdo, P.C.

(57) ABSTRACT

The present invention relates to a solar position tracking accuracy measurement system based on an optical lens, by which the solar position tracking accuracy of a tracker can be effectively analyzed and detected in real-time by using a technique on the basis of an astronomical analysis on the trajectory of the sun through an accurate measurement based on an optical lens, thereby establishing the reproducibility of a physical measurement method, calculating an error angle according to the vertical incidence of solar light and minimizing physical errors.

1 Claim, 8 Drawing Sheets

(58) Field of Classification Search
CPC ... H01L 31/043; G01S 3/7867; G01S 3/7861; G01S 3/786; G01S 3/785; G01S 3/782; G01S 3/781; G01S 3/78
See application file for complete search history.

(56) References Cited

U.S. PATENT DOCUMENTS

| | | | | |
|---|---|---|---|---|
| 3,251,261 | A * | 5/1966 | Lillestrand | G01S 3/7867 356/138 |
| 4,148,300 | A * | 4/1979 | Kaufman, Sr. | F24J 2/06 126/684 |
| 4,206,972 | A * | 6/1980 | Dietzsch | G02B 9/64 359/755 |
| 4,704,011 | A * | 11/1987 | Mercado | G02B 9/60 359/768 |
| H000712 | H * | 11/1989 | Hartman | G01C 21/025 356/139.01 |
| 5,172,275 | A * | 12/1992 | DeJager | G02B 13/24 359/754 |
| 5,305,138 | A * | 4/1994 | Freedenberg | G02B 13/143 359/355 |
| 5,699,202 | A * | 12/1997 | Yamamoto | G02B 13/143 359/754 |
| 5,754,345 | A * | 5/1998 | Yamamoto | G02B 13/143 359/661 |
| 5,798,874 | A * | 8/1998 | Yamamoto | G02B 13/143 359/754 |
| 5,914,823 | A * | 6/1999 | Yamamoto | G02B 13/143 359/749 |
| 6,208,459 | B1 * | 3/2001 | Coon | G02B 1/02 359/350 |
| 7,719,761 | B2 * | 5/2010 | Lau | G01S 3/781 359/399 |
| 7,855,335 | B2 * | 12/2010 | Maeda | H01L 31/0547 136/246 |
| 8,045,178 | B2 * | 10/2011 | Hutchin | G01B 11/002 356/521 |
| 8,289,633 | B2 * | 10/2012 | Caldwell | G02B 13/146 359/642 |
| 9,029,681 | B1 * | 5/2015 | Nielson | F24J 2/06 136/246 |
| 9,274,266 | B2 * | 3/2016 | Ford | F24J 2/067 |
| 9,354,294 | B2 * | 5/2016 | Zhang | H02S 20/32 |
| 2004/0243364 | A1 * | 12/2004 | Wendelin | G02B 27/0012 703/2 |
| 2008/0128586 | A1 * | 6/2008 | Johnson | G01S 3/7861 250/203.4 |
| 2008/0212176 | A1 * | 9/2008 | Baun | G01S 3/7867 359/429 |
| 2009/0114280 | A1 * | 5/2009 | Jensen | F24J 2/06 136/259 |
| 2009/0201585 | A1 * | 8/2009 | Yasui | G02B 13/02 359/558 |
| 2010/0004895 | A1 * | 1/2010 | Wells | G01D 3/022 702/151 |
| 2010/0132765 | A1 * | 6/2010 | Cumpston | H01L 31/035281 136/249 |
| 2010/0175685 | A1 * | 7/2010 | Campbell | F24J 2/38 126/601 |
| 2010/0192940 | A1 | 8/2010 | Yoon | |
| 2013/0008166 | A1 | 1/2013 | Cortes | |
| 2013/0081669 | A1 | 4/2013 | Jungwirth | |
| 2014/0085717 | A1 * | 3/2014 | Baun | G01S 3/7867 359/429 |
| 2016/0146921 | A1 * | 5/2016 | Jeong | G01S 3/7861 250/203.4 |

FOREIGN PATENT DOCUMENTS

| KR | 10-0972746 B1 | 7/2010 |
|---|---|---|
| KR | 10-2011-0014084 A | 2/2011 |

* cited by examiner

SOLAR POSITION TRACKING ACCURACY MEASUREMENT SYSTEM BASED ON OPTICAL LENS

TECHNICAL FIELD

The invention relates to a solar position tracking accuracy measurement system using an off-axis ray based on an optical lens, more particularly, to a solar position tracking accuracy measurement system based on an optical lens, by which the solar position tracking accuracy of a tracker can be effectively analyzed and detected in real-time by using a technique on the basis of an astronomical analysis on the trajectory of the sun through an accurate measurement based on an optical lens, thereby establishing the reproducibility of a physical measurement method, calculating an error angle according to the vertical incidence of solar light and minimizing physical errors.

BACKGROUND ART

In order to increase an efficiency of a solar power system, it is necessary to improve an absolute efficiency of individual parts such as a solar cell or a power converter and perform a power follow control such as a maximum power point tracking (MPPT). Also, the application of the solar tracking systems for allowing the sun to always face in a normal direction on the surface of the solar cell is required.

The research and development of a solar position tracking system pursues a high density energy by increasing a power amount per unit area, so that it can overcome a problem of a small power amount per unit area pointed out as a comparative weak point in the solar power generation system. Also, recently, the interest on the solar position tracking system has been increased and it plays an important role in the market of a concentrating photovoltaic system of gradually finding its place in industry as a part of a very important balance of system (BOS).

It examines an effective tracking time range and an optimum application type appropriate for the concentrating solar cells and optimally applicable to the national climate environment through a basic research for the application of the high efficiency photovoltaic tracking system and the concentrating photovoltaic system. Also, it examines the possibility of application thereof through the comparative analysis of the number of the tracking offset of the user and the final acquisition power amount according to the number of the tracking offset, so that it develops the optimum device for local weather conditions and performs the positive research so as to secure the reliability, establish the efficiency evaluation standard on the tracking system, and establish various verification systems for this.

The solar position tracking apparatus using a sensor using method, a astronomical calculation method, and a hybrid method etc. has been diversified. Also, it requires the accuracy measurement of the solar position tracking and the measurement and evaluation technique on the performance evaluation.

The standardization and regimentation on the tracking accuracy is underway at NREL and the concept of the tracking accuracy is expressed in the IEC/TS 62727.

However, in the concept for the accuracy tracking of the solar position tracking apparatus, since it causes problems such as an occurrence of an error due to a dispersion of light and an inaccuracy of the error calculation owing to a very small cosine angle, it has a practical difficulty in measuring the solar position accuracy tracking. Also, since it is hard to establish the database on the error of the solar position tracking owing to the difficulty of the detecting method of the data using the device, it requires new error analysis techniques for this.

DISCLOSURE

Technical Problem

The present invention has been made in an effort to solve the problems of the conceptual description of the conventional International Standard as described above, and an object of the present invention is to provide a solar position tracking accuracy measurement system through the analysis of the off-axis ray based on the optical lens so as to measure the error of the solar position tracking apparatus.

Technical Solution

According to one aspect of the present invention so as to accomplish these objects, there is provided to a solar position tracking accuracy measurement system based on an optical lens including: an optical lens means 100 including: an eyepiece 110 for refracting the solar light incident thereon, a first convex lens 120 formed on a rear side of the eyepiece, a second convex lens 130 formed on a rear side of the first convex lens, a third lens 140 is formed on a rear side of the second convex lens, and a fourth convex lens 150 formed at a rear side of the third lens; and a solar position measuring means 200 for receiving a sunlight provided from the optical lens means.

Advantageous Effects

According to the solar position tracking accuracy measurement system based on the optical lens having the configuration and operation described above, it is possible to measure the tracking accuracy by analyzing the tracking error of the solar position tracking apparatus using the optical lens.

That is, it analyzes the accuracy of the tracking apparatus using the optical lens and the pattern and direction of the error occurrence, thereby presenting the corrected direction. Also, the error angles are established by the database, so that it can be analyzed all the times of the year and is applicable as a useful device for the system correction and the efficiency analysis.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

100: Optical lens means
110: Eyepiece
120: First convex lens
130: Second convex lens
140: Third lens
150: Fourth convex lens
200: Solar position measuring means

BEST MODE

Mode for Invention

According to one aspect of the present invention so as to accomplish these objects, there is provided to a solar position tracking accuracy measurement system based on an optical lens including: an optical lens means 100 including: an eyepiece 110 for refracting the solar light incident thereon, a first convex lens 120 formed on a rear side of the eyepiece, a second convex lens 130 formed on a rear side of the first convex lens, a third lens 140 is formed on a rear side of the second convex lens, and a fourth convex lens 150 formed at a rear side of the third lens; and a solar position measuring means 200 for receiving a sunlight provided from the optical lens means.

At this time, the solar position measuring means 200 includes: a sensing unit 210 for forming a target surface of a matrix structure using a photosensitive device; a coordinate information detection unit 220 for detecting a coordinate of a cell having a changed electrical signal when a focal area is formed on an arbitrary point; a coordinate information transmission unit 230 for transmitting the generated coordinate information to a display unit; the display unit 240 for displaying the coordinate information received from the coordinate information transmission unit; and an error rate calculating unit 250 for calculating an error rate of a solar position tracker.

At this time, an output angle is larger than an incident angle by means of the optical lens means 100.

At this time, the photosensitive device is any one of photo sensors such as a silicon, a compound semiconductor, a CIGS solar cell, a CdS, a photodiode, and a phototransistor.

At this time, the first convex lens, the second convex lens 130, and the fourth convex lens use an ultra-low dispersion glass (apochromatic lens) so as to reduce an aberration thereof.

At this time, the solar position measuring means 200 finds and detects an error of an incident angle by increasing a cosine pointing error using an off-axis ray of the lens and measures the error of the solar position tracking apparatus by removing an inaccuracy caused by a dispersion of the sunlight and enlarging the cosine error angle.

Hereinafter, a solar position tracking accuracy measurement system based on an optical lens of the present invention will be described in detail with reference to the accompanying drawings.

The present invention will propose an error analysis method of a solar position tracker based on the geometrical optics and thus, explain an effectiveness and a validity of the physical measurement method.

The solar tracking system includes a sensor type manner, a program type manner, and a hybrid type manner.

Also, it is classified into a single axis tracking type system or a double axis tracking type system depending on the number of a driving axis.

The single axis tracking type system is a tracker capable of tracking only the azimuth or the elevation angle according to the position change of the sun by rotating the tracking object through one axis.

In general, the rotation axis is fixed to the East-West or North-South based on the installation point of the system.

Also, in case of some systems, it is designed that the tracking object is fixed at an angle of inclination with the latitude of the installation region and the rotation axis is parallel to the earth's rotation axis, so that it can track only the time axis of the sun by means of the rotation of the lighting parts.

In case of the solar position tracking system of an axis driving type, it can track the solar position on the elevation angle as well as the time angle thereof, so that it is possible to track the solar position more accurate.

TABLE 1

| Classification of tracking method | Signal generation method | Advantage | Disadvantage |
|---|---|---|---|
| Natural type method | Tracking without electronic circuit/motor drive | Simple structure and less maintenance cost | No precise tracking |
| Method according to astronomical calculations | Astronomical sun position calculation and solar cell module drive | Precise traceability Traceable in case of low cleanness index | Necessity of azimuth setting during initial setup Advanced Processor |
| Position tracking of optical sensor method | Use of sun position detecting sensor and motor driving according to sensor signal | Simple structure Intuitive algorithm | Malfunctioning concern by scattering sunlight |
| Astronomical calculation/sensor complex method | Complex method of program method and sensor method | Disadvantages supplement of calculation and sensor methods high precision | Complicated structure high price |

In case of the tracker using the astronomical calculation method, it is possible to precisely track the position of the sun through the advanced processor operation. However, a backlash, which is the largest disadvantage, is existed therein.

The backlash is defined by the free motion in the drive system of the tracker and may be generated by the mating process of each axis, the operation of or a pin or other mechanical coupling part, the elasticity of a hydraulic device, the different mechanisms according to the system characteristics, or the strong wind power.

Input data of the solar position tracking apparatus according to astronomical calculations is an azimuth and an elevation angle and is displayed by applying the solar elevation angle and azimuth at the coordinate plane of the earth surface. The elevation angle of the sun is an angle between a line of connecting the sun to the installation point of the solar position tracking apparatus and the surface of the earth.

The azimuth angle is an angle measured clockwise between a line of connecting the projected solar coordinate to the origin of coordinates and the due north on the coordinate, The elevation angle of the sun is calculated by the equation 1 and the azimuth is calculated by equation 2.

$$\sin\theta_e = \sin\delta\sin\phi + \cos\delta\cos\phi\cos H \quad \text{[Equation 1]}$$

$$\sin\theta_a = -\frac{\cos\delta\sin H}{\cos\theta_e} \quad \text{[Equation 2]}$$

Here, "δ" is the declination of the sun, an angle measured between the equatorial plane and the star along the hour circle of equatorial, and has a value of 0°~±90°, "ø" is a latitude of the measurer, and H denotes a hour angle, which is an angle between the meridian and the inner circle of passing through the celestial body.

The solar position calculation method according to the astronomical calculation performs a floating-point operation by employing a high-speed processor or supports a computational function through a computer, so that it can meet with superior tracking results on the solar position.

However, it requires the compensation functions such as a self-compensation function for high accuracy due to the increase of production costs, the difficulty in spot adoption, or the structural error generation factors such as the backlash.

In addition, the implementation of the high-accuracy tracker results in the increase of the power consumption. Accordingly, it requires the best design thereof.

It should be calculated in accordance with the equilibrium conditions according to the calculation of the electric power cost and the power amount.

Figure 1:
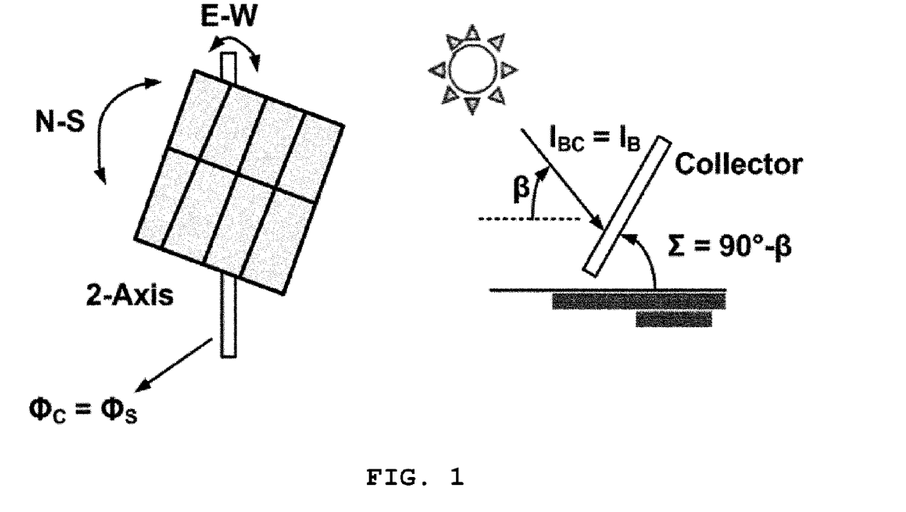
FIG. 1 is a basic structural diagram illustrating a solar position tracker.

In general, as shown in FIG. 1, the rotation axis is fixed to the East-West or North-South based on the installation point of the solar cell array.

Figure 2:
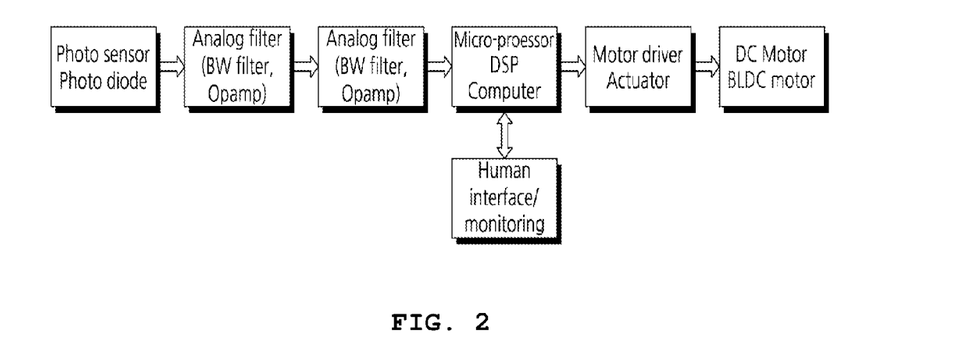
FIG. 2 is a block diagram illustrating a solar position tracker using a common sensor.

On the other hand, as shown in FIG. 2, in the method using the sensor, it establishes the reaction condition or position of the sensor or the mechanical light and shade condition by using the photosensitive devices and parts such as a photodiode or a solar cell, a photo sensor, goes through the A/D conversion process on the basis of the values inputted from the sensors, performs a condition determination through the microprocessor, and transmits the signal to the motor drive so as to determine the solar position, thereby tracking the sun's position.

The structure of the sensor module for detecting the position of the sun is various.

However, the time for detecting the sensor detection value is not fixed depending on the season owing to the configuration of the lens or the mechanical support system. Also, it requires the preparation for the scattered solar radiation.

To this end, it utilizes the high sensitive photo sensor and there is an attempt of maintaining a constant detection time through the mechanical improvement. However, there is still a structural limit.

On the other hand, in the tracking apparatus for photovoltaic power generation, as the number of the driving and stop of the driving device has been decreased, the power consumption and the failure rate is reduced.

Also, since the tracking number of the tracking apparatus is determined depending on the error angle of the sunlight, it should ensure the accurate absolute measurement value of the solar position tracker.

Figure 3:
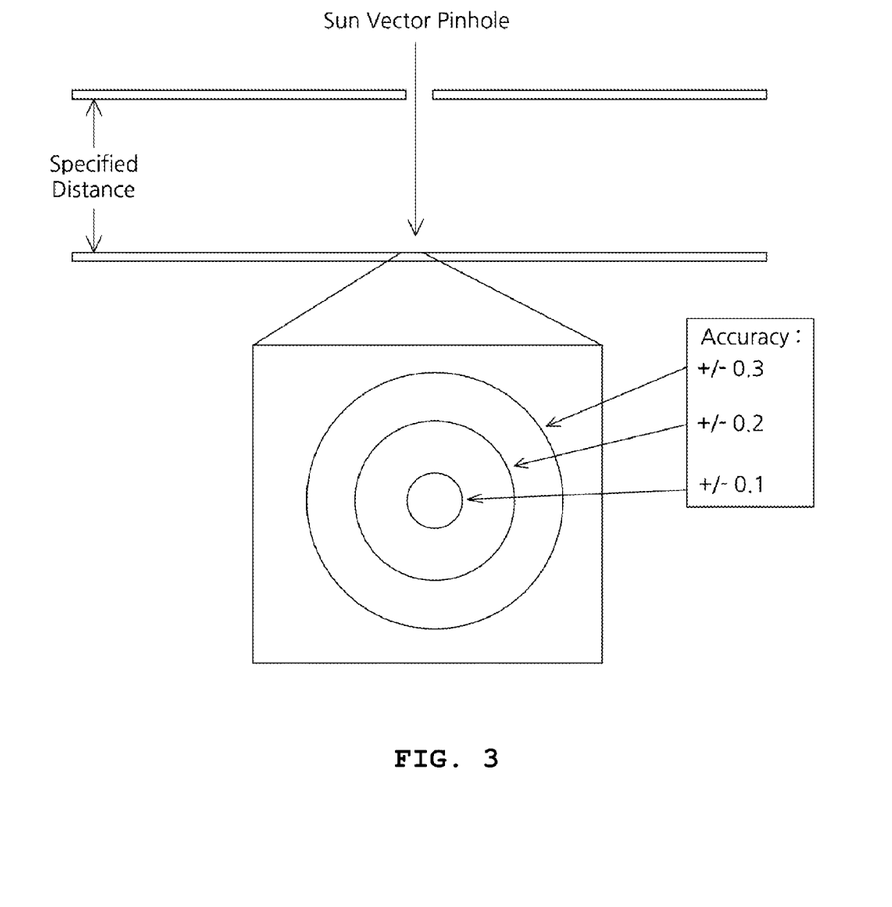
FIG. 3 is a concept diagram illustrating an accuracy measurement of a solar position tracker presented in a standardized IEC/TS 62727.

According to the standard IEC/TS 62727, it can provide the concept of the accuracy measurement of the solar position tracker as shown in FIG. 3.

This method can determine the difference between the vertical incidence angle and the operation angle by calculating the cosine angle on the incident light.

The concept proposed in the IEC/TS 62727 utilizes the measurement method using a pointing error. That is, it measures the experimental accuracy of the solar position tracker through the pointing error determination method in a certain time.

In this method, two plates are separated from each other at a certain distance and it is punched in the form of a projector so as to measure the position of the sun.

One plate includes a pin hole of passing through the sunlight incident at a specific distance and a circular target surface having the angles of 0.1°, 0.2°, and 0.3° is formed at the inside of the other plate.

The image of the transmitted sunlight can be analyzed through a sensitizing paper, a photodiode array or an image sensor.

In case of the sensitizing paper for the simple determination, the sunlight is marked by using a paper treated with a photosensitizer for giving the photosensitivity to the paper, so that it can determine the performance of the solar position tracker.

Hereinafter, the error measurement method based on the precision optical lens will be described.

In the basic pointing error method, as a "f" becomes larger, the light is distributed. Accordingly, there is a problem in that an image formation becomes larger on the target surface.

When the focal area measurement accuracy of the tracking becomes larger, the accuracy of the measurement in accordance with the accuracy measurement of the tracking apparatus is lowered and it raises the failure of the sensor due to the difference in the light amount.

Also, as the distance between the two plates is shorter, the focus has a good characteristic. However, it is difficult to calculate the cosine error.

Figure 4:
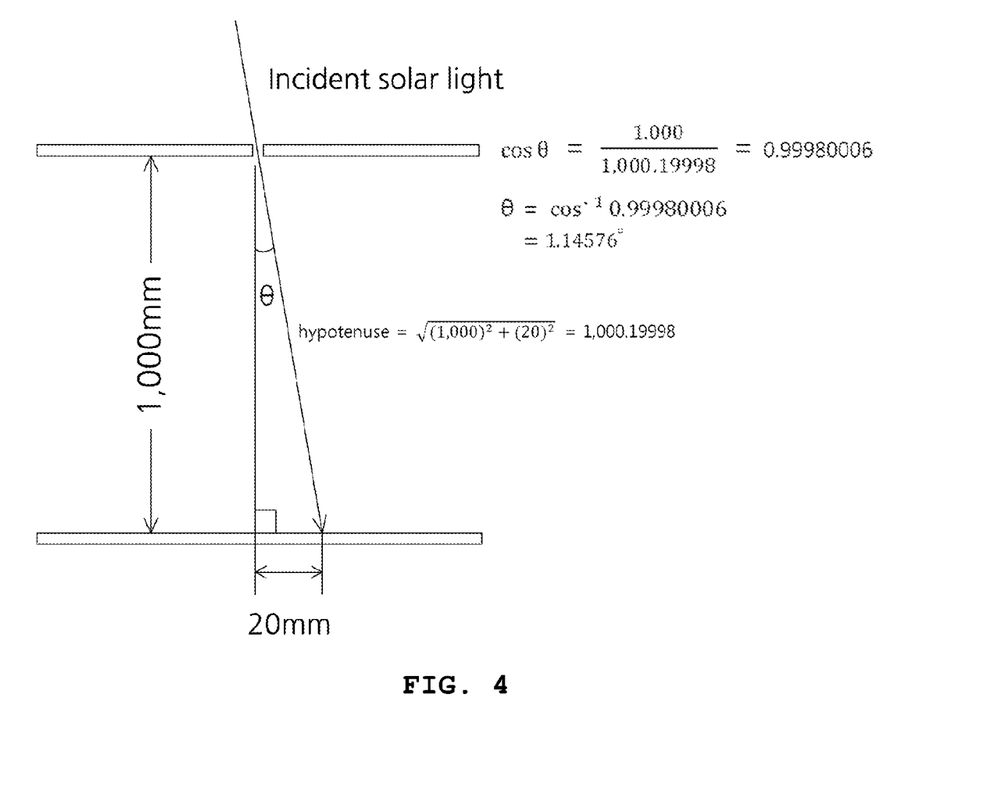
FIG. 4 illustrates an detection example of an error angle when a distance is 1,000 mm.

FIG. 4 shows a result of performing a calculation according to a pointing error measurement method.

Assuming that the target is located at the focal length of 1,000 mm, it can measure an angle error of approximately 1.15°.

At this time, when θ is 1.15, the focal area is away at a distance of 20 mm. Here, When the θ becomes small, since this distance is more narrow, it is difficult to perform the physical detection.

In case of the device for measuring the tracking accuracy, since it must measure the error angle having a calculation range of about 0.001°, the expansion of the incident angle is required.

Accordingly, in the present invention, right and left and top and bottom parts of the images are reversely shown through a convex lens and an eye lens by introducing the concept of the refraction type scope.

In order to remove the chromatic aberration, it uses the combined concave and convex lens having different characteristics and the convex lens portion uses an ultra-low dispersion glass (apochromatic lens) so as to reduce the aberration.

Figure 5:
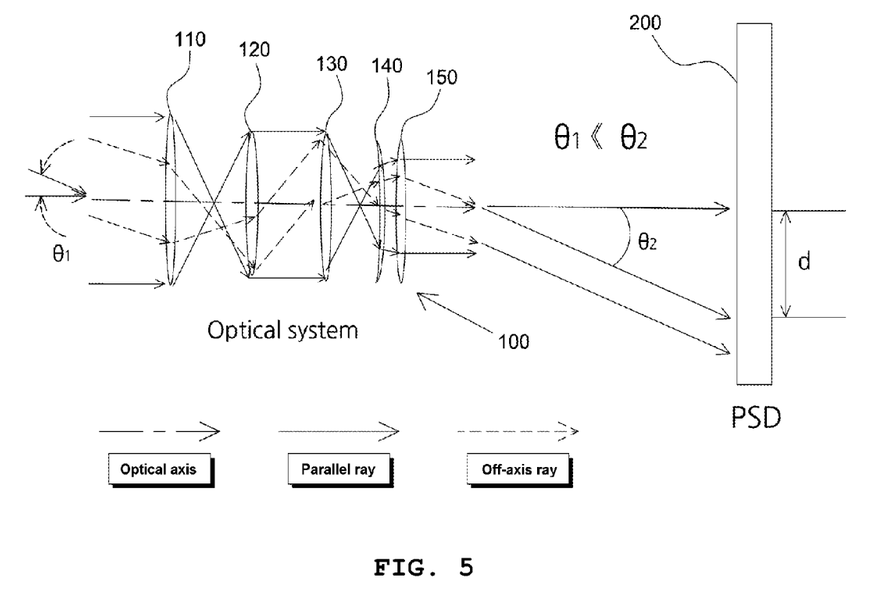
FIG. 5 is an entire structure diagram illustrating a solar position tracking accuracy measurement based on an optical lens according to an embodiment of the present invention.

An optical structure according to the solar position tracking accuracy measurement based on the optical lens is shown in FIG. 5.

That is, as shown in FIG. 5, since it illustrates $\theta_1 \ll \theta_2$, the small incidence angle is changed into the large incident angle on the target surface so as to effectively measure it.

Concretely, an optical lens means 100 of a solar position tracking accuracy measurement system based on an optical lens according to the present invention includes: an eyepiece 110 for refracting the solar light incident thereon; a first convex lens 120 formed on a rear side of the eyepiece; a second convex lens 130 formed on a rear side of the first convex lens; a third lens 140 is formed on a rear side of the second convex lens; and a fourth convex lens 150 formed at a rear side of the third lens.

The eyepiece 110 serves to refract the solar light incident thereon and it includes the first convex lens and the second convex lens separated from and parallel to the first convex lens at a predetermined distance.

In addition, the third lens is formed on the rear side of the second convex lens and the fourth convex lens 150 is formed at the rear side of the third lens, so that it becomes $\theta_1 \ll \theta_2$.

The optical lens includes three parts (the eyepiece, the first convex lens—the second convex lens, and the third lens—the fourth convex lens).

It is configured to make the $\theta_2$ of the large angle having the same shape as the subject.

To this end, the thickness and the curvature of the curved surface of the lens are adjusted, so that it increases the output angle and collects the light.

The progress of the rays subjects to the law of refraction and is shown in the following equation 3 and the imagery equation in the refractive spherical surface is shown in the following equation 4.

Here, "n" denotes a refractive index and "r" denotes a curvature radius of the lens.

$$n_2 \sin\theta_2 = n_1 \sin\theta_1 (n_1 n_2 : refractive\, index) \quad \text{[Equation 3]}$$

$$\frac{n_1}{p} + \frac{n_2}{i} = \frac{n_2 - n_1}{r} \quad \text{[Equation 4]}$$

FIG. 3 illustrates a structure to adjust the focal area within the diameter of 1 mm by adjusting the f value of the optical lens applied to the measurement.

Here, the distance from the incident surface to the target surface is 665 mm.

After it sets to be incident in the normal direction of the sun by using a refractive type lens and the angle of the equator is adjusted at a angle of 0.1°, when the error of the incident angle is randomly given, it can be observed that the focal area is shifted to 5 mm in the opposite direction the incident light.

In the refractive lens, since the optical tube assembly is stitched, it is necessary to completely protect the optical system. Also, the flow of air is reduced, so that it can exhibit stable performance and maintain the high performance in a bad environment.

Also, in the case of the present invention, it includes a structure consisting of three groups and five lens.

Figure 6:
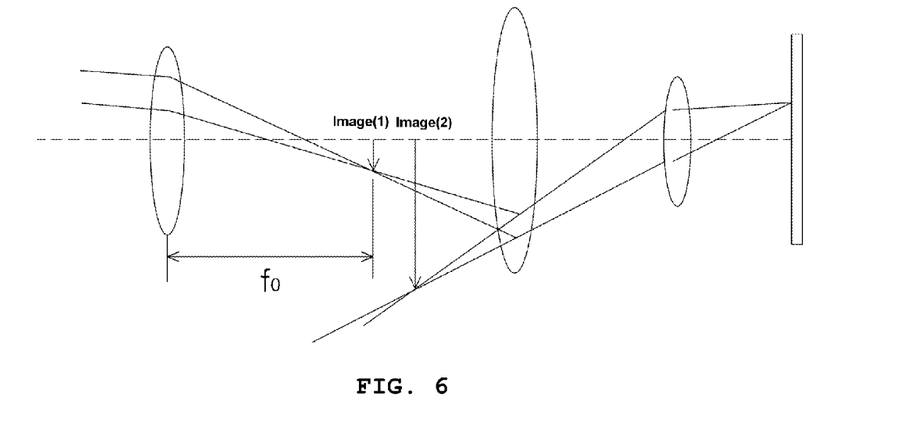
FIG. 6 is an example view illustrating a focus of a convex lens and a path of a light.

FIG. 6 illustrates a focus of a convex lens and a path of a light.

Where "a" denotes a distance between the object and the lens, "b" denotes a distance between the image and the lens, and "$f_0$" denotes a focal distance, it is shown in the following equation 5.

$$\frac{1}{a} + \frac{1}{b} = \frac{1}{f_0} \quad \text{[Equation 5]}$$

Also, when it is applied to the observation of the sun, if "$f_0$" is substantially ∞, it is shown in the following equation 6.

$$b \approx f_0 \quad \text{[Equation 6]}$$

The image through the objective lens is focused on the second focal point of the objective lens.

The objective lens makes the image (1) from the light of the object stretching to infinity.

Where the focus of the objective lens is coincided with that of the eyepiece in the observation of the sun light, the light incident in parallel with the objective lens again goes out in parallel through the eyepiece so as to form a focal area.

The light incident in parallel with the eyepiece is focused on the sensor surface.

By adjusting the focal position of the optical lens, the position and accuracy of the image can be modified and corrected.

Figure 7:
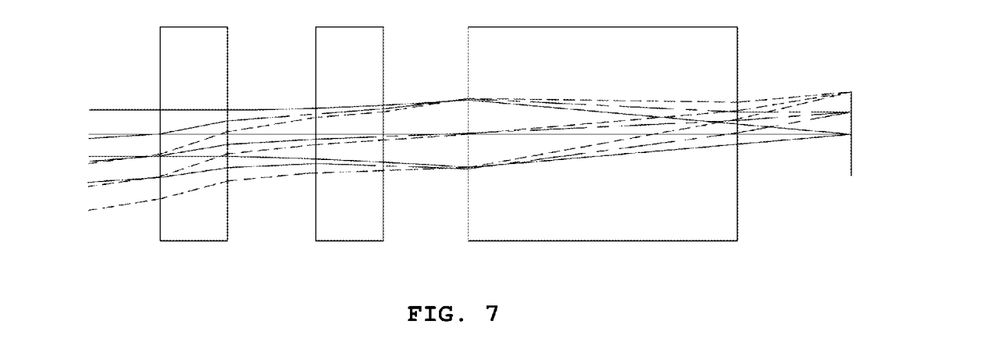
FIG. 7 is a diagram illustrating a simulation result.
Figure 8:
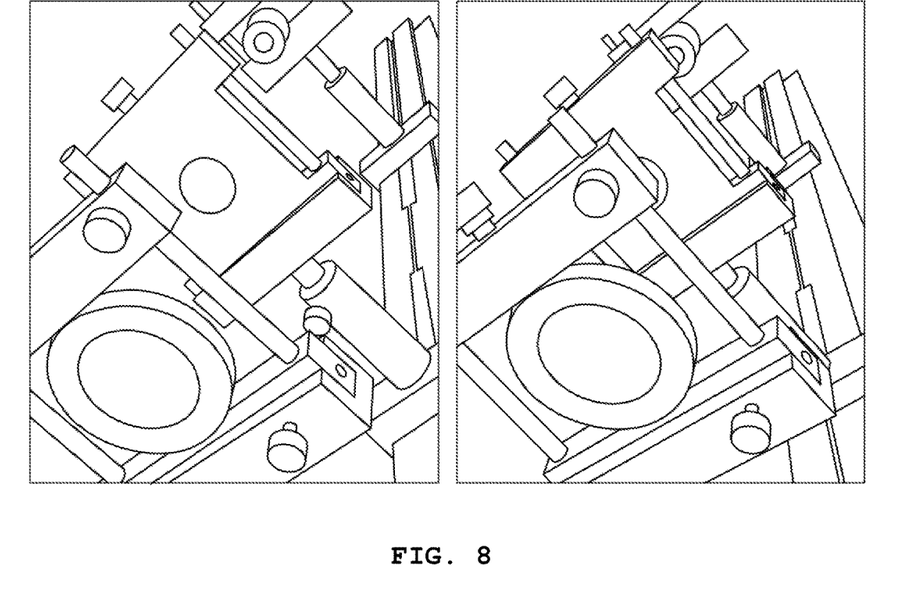
FIG. 8 is an example view illustrating a solar position tracking accuracy measurement apparatus based on an optical lens according to the present invention.

FIG. 7 shows a simulation result and FIG. 8 is an example view of showing a solar position tracking accuracy measurement apparatus based on an optical lens according to the present invention.

On the other hand, the measuring system for the solar position tracking system can improve the quality through the performance diagnosis, the maintenance, and the normalized and standardized procedure.

To this end, it improves the accuracy of the measuring analysis and quantifies the loss thereof, so that it conducts the performance analysis, thereby establishing the measurement data through the performance and quality thereof.

Figure 9:
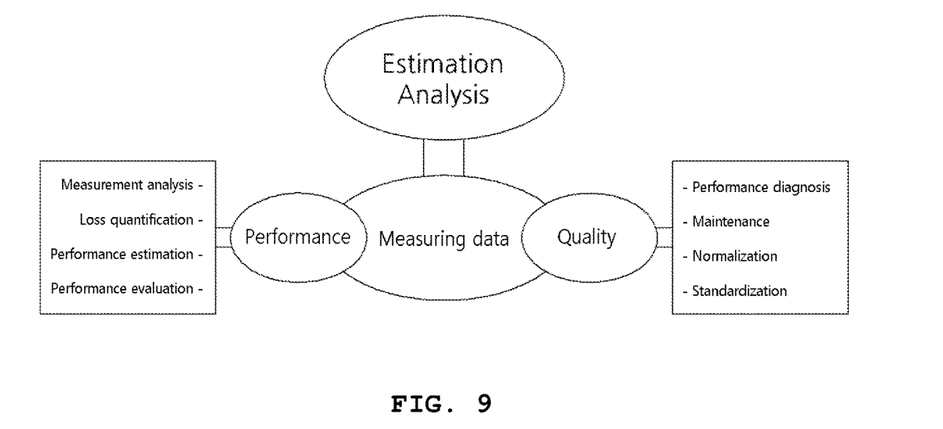
FIG. 9 is a diagram illustrating an approach of the evaluation analysis method in accordance with a solar position tracking accuracy measurement.

FIG. 9 is a diagram illustrating an approach of the evaluation analysis method in accordance with a solar position tracking accuracy measurement.

According to the solar position tracking accuracy measurement method based on the optical lens according to the present invention, the solar position tracking accuracy of the tracker can be effectively analyzed and detected in real-time by using the technique on the basis of the astronomical analysis on the trajectory of the sun through the accurate measurement based on the optical lens, the reproducibility of a physical measurement method can be established, the error angle according to the vertical incidence of solar light can be calculated, and the physical errors can be minimized, thereby precisely designing the optical system.

That is, it is provided by a solar position measuring means 200.

In the optical system having a structure in that the focal area is formed without the diffusion of the incident light, the focal area is formed on the target surface, so that it is possible to implement a variety of applications.

Figure 10:
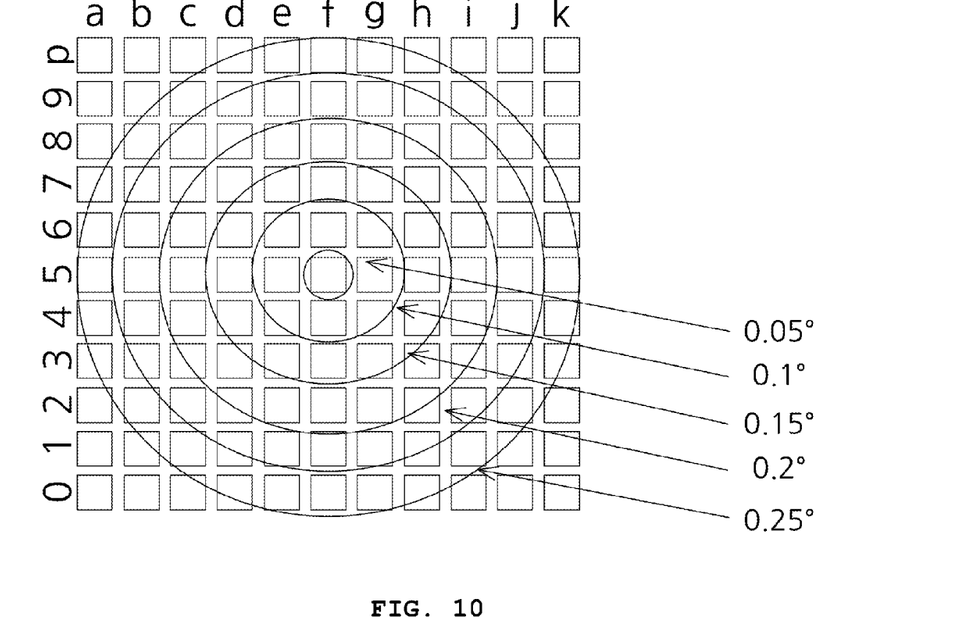
FIG. 10 is a diagram illustrating an example of applying a photosensitive device to a target surface of a focal area in a solar position tracking accuracy measurement system based on an optical lens according to an embodiment of the present invention.

As shown in FIG. 10, it constitutes a target surface of a matrix structure through a variety of photosensitive sensors.

The kind of the photosensitive sensor may be various the photo sensors etc. such as a silicon, a compound semiconductor, a CIGS solar cell, a CdS, a photodiode, and a phototransistor.

On the other hand, the solar position measuring means 200 serves to find and detect the error of the incident angle by increasing the cosine pointing error using an off-axis ray of the lens. That is, the solar position measuring means 200 serves to measure the error of the solar position tracking apparatus by removing the inaccuracy caused by the dispersion of the light and enlarging the cosine error angle.

Figure 11:
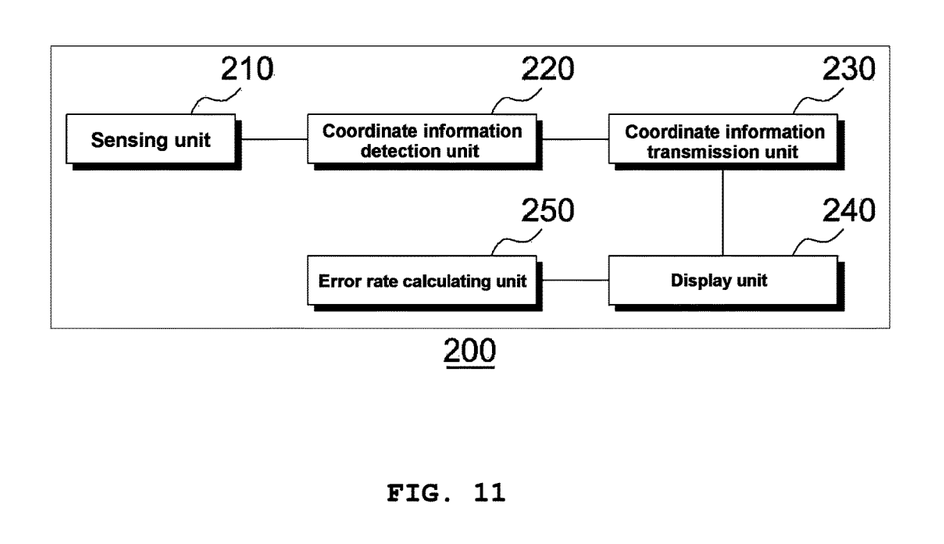
FIG. 11 is a block diagram illustrating a solar position measuring means of the solar position tracking accuracy measurement system based on the optical lens according to an embodiment of the present invention.

FIG. 11 is a block diagram illustrating a solar position measuring means of the solar position tracking accuracy measurement system based on the optical lens according to an embodiment of the present invention.

As shown in FIG. 11, the solar position measuring means 200 includes a sensing unit 210 for forming a target surface of a matrix structure using a photosensitive device; a coordinate information detection unit 220 for detecting a coordinate of a cell having a changed electrical signal when a focal area is formed on an arbitrary point; a coordinate information transmission unit 230 for transmitting the generated coordinate information to a display unit; the display unit 240 for displaying the coordinate information received from the coordinate information transmission unit; and an error rate calculating unit 250 for calculating an error rate of a solar position tracker.

That is, the sensing unit 210 serves to form the target surface of the matrix structure using the photosensitive device.

At this time, the coordinate information detection unit 220 serves to detect the coordinate information of the cell, in which the electrical signal is changed, when the focal area is formed in the arbitrary point.

Then, the coordinate information transmission unit 230 serves to transmit the generated coordinate information to the display unit and the display unit 240 serves to display the coordinate information received from the coordinate information transmission unit 230.

At this time, the error rate calculation unit 250 serves to calculate the error rate of the solar position tracker, thereby easily analyzing and observing the degree of the error rate by means of an observer.

It transmits the generated coordinate information to the computer, so that the error occurrence degree and error correction time of the tracker, the tracker operation time, and the operation time interval etc. can be grasped, thereby analyzing the performance of the tracker and correcting the function thereof. Accordingly, it can establish a good database number, which can have a direct impact on the development performance and the economic analysis.

Accordingly, the present invention will be of great help in analyzing the development performance, the efficiency, and the economic feasibility in the performance analysis institution of the sun position tracker and the solar power generation operator or research institution.

Although the invention has been described according to the preferred embodiment mentioned above, the invention can be variously changed and modified without deviating from the essential point and scope of the invention. Accordingly, the accompanying Claims include such change and modification belonging to the essential point of the invention.

INDUSTRIAL APPLICABILITY

The present invention can provide the solar position tracking accuracy measurement system through the analysis of the off-axis ray based on the optical lens so as to measure the error of the solar position tracking apparatus, so that it can be usefully utilized in the field of the photovoltaic power generation.

What is claimed is:

1. A solar position tracking accuracy measurement system based on an optical lens comprising:
   a plurality of optical lenses consisting of
      an eyepiece on which a solar light is incident at an incident angle, the eyepiece refracting the solar light incident thereon,
      a first lens formed on a rear side of the eyepiece, the first lens being a convex lens,
      a second lens formed on a rear side of the first lens, the second lens being a convex lens,
      a third lens formed on a rear side of the second lens, and
      a fourth lens formed at a rear side of the third lens, the fourth lens being a convex lens; and
   a photosensitive device, wherein the solar light passes through the eyepiece and the first to fourth lens, and the solar light outputted from the fourth lens is directly incident on the photosensitive device at an output angle,
   wherein the eyepiece and the first lens directly face each other, without another lens being disposed between the eyepiece and the first lens,
   wherein the first and second lenses directly face each other, without another lens being disposed between the first and second lenses,
   wherein the second and third lenses directly face each other, without another lens being disposed between the second and third lenses,
   wherein the third and fourth lenses directly face each other, without another lens being disposed between the third and fourth lenses, and the third lens has two opposite surfaces including a first surface concave toward the second lens and a second surface convex toward the fourth lens,
   wherein the fourth lens and the photosensitive device directly face each other, without another lens being disposed between the fourth lens and the photosensitive device, and the fourth lens having two opposite surfaces including a third surface convex toward the third lens and a fourth surface convex toward the photosensitive device,
   wherein the plurality of optical lenses are configured such that the output angle is larger than the incident angle,
   wherein the photosensitive device is any one of a solar cell, a CdS photo sensor, a photodiode and a phototransistor,
   wherein each of the first lens, the second lens, and the fourth lens includes an apochromatic lens.

* * * * *